March 16, 1954     G. LUNDQUIST     2,671,980
RATTRAP
Filed Feb. 13, 1950     2 Sheets-Sheet 1
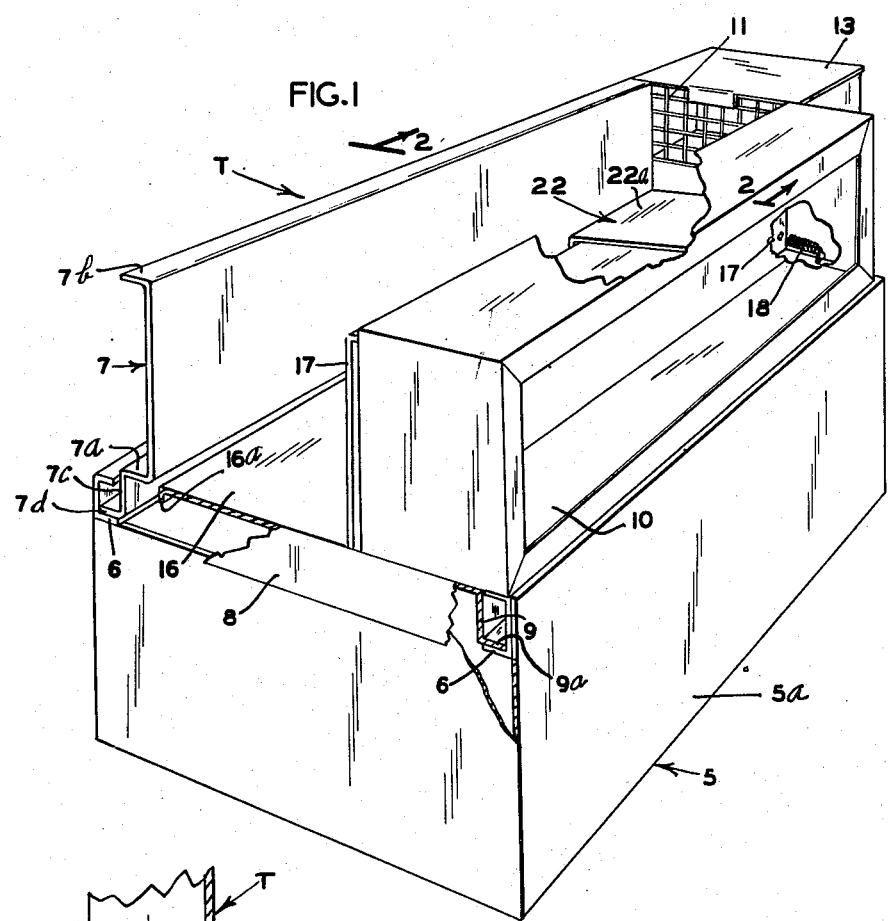
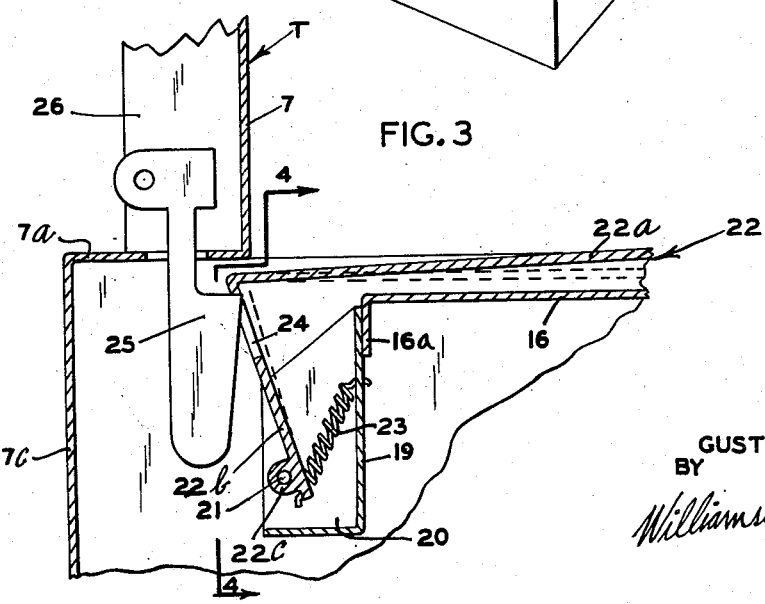
INVENTOR
GUST LUNDQUIST
BY
*Williamson & Williamson*
ATTORNEYS

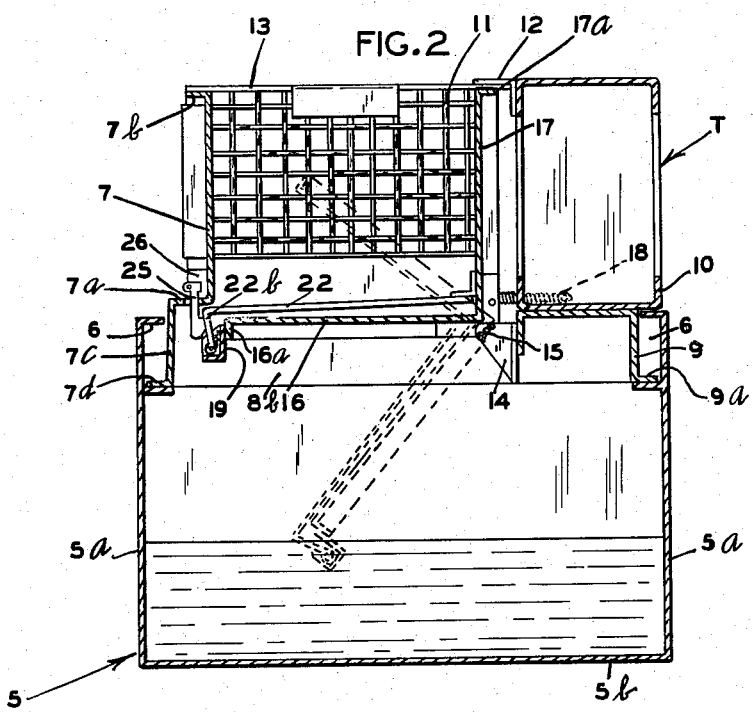
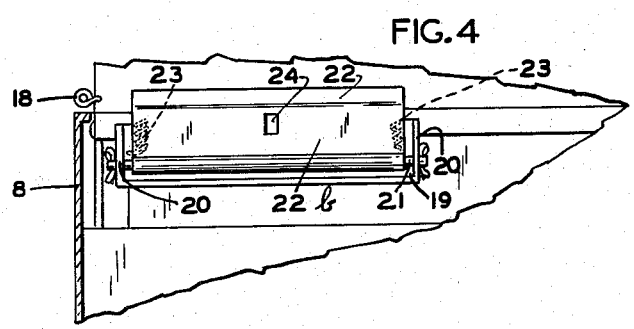

Patented Mar. 16, 1954

2,671,980

UNITED STATES PATENT OFFICE 2,671,980

RATTRAP

Gust Lundquist, Duluth, Minn.

Application February 13, 1950, Serial No. 143,890

1 Claim. (Cl. 43—70)

This invention relates to traps for effectively catching various rodents such as rats.

The constant warfare which mankind is waging against such rodents as rats is complicated by their cautious and elusive nature. It is imperative that a trap for catching these rodents, in order to be truly effective, must not only attract the animal into a position where it will spring the trap but must also insure that once the animal has been lured into that position it will be impossible for it to escape. Many of these rodents, especially rats, seem to have an uncanny ability to spring a trap, being careful meanwhile to avoid being caught therein.

It is an object of my present invention to provide an improved, simple and most efficient trap for rats and other rodents which will preclude such an animal from escaping once it has sprung the trap and which will re-set itself once it has been sprung.

Another object is to provide a rat trap which can not be sprung by the rat without the animal having its entire body within the confines of the trap and which will utilize lever action to insure that the trap, once the rat has entered it, will be sprung by a very minimum of pressure exerted by the rat on the trip element.

A further object is to provide an improved trap wherein the rodent is attracted by the smell or sight of bait into a relatively long narrow lane or tunnel having a false bottom which provides a misleading sense of security to the animal until it has progressed far enough toward the bait to spring the trap, whereupon the entire false bottom is suddenly withdrawn to drop the rodent into an escape-proof container.

Another object is to provide a unitary trapping mechanism which is adapted to be utilized in conjunction with various containers to form a complete trap and to be removably secured to the same.

These and other objects and advantages of my invention will more fully apear from the following description made in connection with the accompanying drawings wherein like reference characters refer to the same or similar parts throughout the several views and in which:

Fig. 1 is a perspective view of one embodiment of my invention with portions broken away to show the method of mounting the same, the platform raising spring, and the trip member;

Fig. 2 is a vertical sectional view along line 2—2 of Fig. 1 showing in broken lines the trap platform and expelling flange when in sprung position;

Fig. 3 is an enlarged fragmentary view of the latching and trip mechanism, showing in broken lines the position of the trip member when depressed;

Fig. 4 is a fragmentary view along line 4—4 of Fig. 3.

My present invention includes, as shown, a unitary trapping mechanism constructed for use in conjunction with various containers. Fig. 1 shows such a container in the form of a box-like retaining chamber 5 having imperforate side walls 5a and bottom wall 5b and having an open top portion over which my trapping mechanism, designated generally as T, is secured. As shown, the retaining chamber 5 has a pair of parallel channels 6 along the upper edge of two opposite side walls 5a. These two channels 6 co-operate to hold the superstructure shown which is my unitary trapping mechanism T.

My trapping mechanism T is comprised of a side panel 7 which has an outwardly extending flange 7a along its lower edge and an outwardly extending flange 7b along its upper edge. At the outer edge of the flange 7a the panel bends downwardly to form a vertical portion 7c and then again outwardly to form a flange 7d, as shown in Figs. 1 and 2. The flange 7d co-operates with the channel 6 of the retaining chamber 5 to hold the entire trapping mechanism T in place above the retaining chamber 5. The vertical portion 7c and the horizontal flange 7a are connected by a transverse plate 8 to a supporting bridge member 9 which is shaped, as shown in Fig. 2. A similar transverse plate connects the forward end of the bridge member 9 to the forward end of the portions 7a, 7c and 7d of the panel 7 to provide an abutment member when the mechanism is slid into the channels 6. The bridge member 9 has an outwardly extending flange 9a which serves a purpose similar to the flange 7d, in co-operation with the opposite channel 6. Superimposed on the bridge member 9 and secured thereto in any suitable manner such as spot-welding, is a box-like structure 10, as shown in Figs. 1 and 2. The top surface of the box-like structure 10 is of substantially an equal elevation as the flange 7b. This box-like structure 10 in co-operation with the panel 7 forms what is essentially a lane for the passage of rodents therethrough. The upper portion of the panel 7 is joined to the near edge of the upper portion of the box-like structure 10 by a grid-pattern screen 11. The apertures of the screen 11 are sufficiently large to permit a rodent to nibble at bait placed on the opposite side relative to the rodent, but small enough to prevent the rodent from passing therethrough. A short angle plate 12 has one of its sides secured to the uppermost portion of the box-like structure 10 and has its other side extending inwardly toward the panel 7. A non-perforate bait holder 13 which has one open side and is equipped with a channel for receiving the flange 7b and the horizontal portion of the angle iron 12 is provided for mounting by means of the channel. Secured to the opposite ends of the box-like structure 10 and the bridge member 9 is a pair of pivot ears 14. Extending between these pivot ears 14 is a pivot rod 15. A trap platform 16 is mounted longitudinally for pivoting movement on the pivot rod 15 and is provided with a downwardly extending flange 16a and a vertical expelling flange 17. This vertical expelling flange 17 has an outwardly extending flange 17a at both its ends and along its top edge. A contractile spring element 18 is secured to the outer surface of the box-like structure 10 adjacent its forward end and to the vertical expelling flange 17. Secured to the forward portion of the flange 16a is a relatively short outwardly facing angle plate 19. This angle plate 19 has a pivot ear 20 secured to each of its ends and shaped as shown in Fig. 3. Pivotally mounted for lever action on a pivot rod 21 which extends between the two pivot ears 20 is a trip plate 22. The trip plate 22 and the trap platform 16 are both low enough to permit light to pass beneath the bait holder 13 into the lane formed by the panel 7 and the box-like structure 10. The trip plate 22 has a horizontal portion 22a and an acutely bent downwardly extending portion 22b, shaped as shown in Fig. 3. As shown in Fig. 3 the downwardly extending portion 22b has a pair of flanges 22c formed adjacent its lower edge on each of its ends. One contractile spring element 23 is secured at each end and at the lower edge of the downwardly extending portion 22b to the angle plate 19. A small centrally located portion of the downwardly extending portion 22b is punched out to form an aperture 24, which serves as a latch element in co-operation with a pivotally mounted latch element 25. The latch element 25 is provided as shown in Fig. 3 with an off-dead-center pivot, secured to an upstanding anchor plate 26 which is disposed opposite the medial portion of the trip member 22 and its latch element 24.

My rat trap is easy to assemble for co-operative association with various types of containers and operates with substantially 100% efficiency. The bait holder 13 because of its imperforate nature makes the bait inaccessible for the rat unless the animal enters the lane formed by the panel 7 in the box-like structure 10 and thereby places the weight of its body upon the trap platform 16. As the rat enters the open end of the trap mechanism T, which is shown on the left hand side of Fig. 1, it is provided with a false sense of security, inasmuch as the trap platform 16 is held rigidly in place by the latch element 25 and its co-operating latch element 24. Since the rat can see light at the other end of the lane it feels that it has an easy avenue of escape regardless of what may arise behind it and so proceeds forward toward the bait. Since the trap platform 16 is elongated the entire body of the rat rests upon the trap platform 16 before it comes in contact with the trip element 22. In order to reach a position where it can nibble at the bait which has been placed adjacent the grid-pattern screen 11, it is necessary that the rat place at least some pressure upon the trip plate 22 by placing its forepaws thereupon or in some other manner. Because of the lever action which is provided by the shape of the trip element 22 and the position of the pivot rod 21 adjacent the low edge of the portion 22b, a very minimum of pressure is required to cause the trip element 22 to be depressed. The lever action provided by the arrangement shown in Fig. 3 provides a great deal of purchase at the point where the two latch elements 24 and 25 co-operate. The slightest of pressure on the trip plate 22 because of this lever action will cause the trip plate to move downwardly until it rests upon the trap platform 16. By so doing the knocked out section of the vertical portion 22b is drawn toward the right, as shown in Fig. 3 to the position shown by broken lines. As can be seen by referring to Fig. 3 the two latch elements are unable to co-operate when the trip plate 22 is in this position and consequently the trap platform 16 is no longer provided with a means of support. The weight of the rat is more than amply sufficient to cause the trap platform 16 and its expelling flange 17 to pivot as shown in Fig. 2 and swing downwardly, dumping the rat into the retaining chamber 5. The expelling flange 17 thrusts the rat into the chamber 5 and precludes the escape of that rat and any other rats previously caught. At the same time it prevents the rat which tripped the mechanism from scampering upwardly along the sides of the lane so as to escape. When in actual use it has been found to be advantageous to fill the imperforate retaining chamber 5 with water so that the rats will be drowned as they are caught. As soon as the weight of the rat has left the trap platform 16, the contractile spring 18 causes the platform 16 to be returned to its original position. The position of the spring 18 should be noted. It is secured to the flanges 17a at a point adjacent the pivot of the trap platform 16 and the expelling flange 17 so as to provide a pulling force sufficient to return the trap platform to its original position quickly and yet weak enough so that the weight of a rat is more than ample to cause the platform 16 to pivot. As the trap platform 16 returns to its original position it, of course, carries the trip plate 22 upwardly with it. When the point of angulation between the horizontal portion 22a and the downwardly extending portion 22b comes in contact with the latch element 25 the latter swings outwardly to permit the trip plate 22 to pass upwardly to a position where the two latch elements may again co-operate to hold the trap platform in supported position. As soon as the trap platform reaches its original position, the latch element 25 is caused to pivot by gravity and returns to a position where it will engage its co-operating latch element 24. Thereafter the trap is once again re-set and ready to catch additional rats.

One advantage of my rat trap is that the trip member 22 is disposed above the forward portion of the trap platform 16 rather than ahead of it. This positioning of the trip member does not arouse suspicion on the part of the rat, since it appears to be merely one piece placed above another in contrast to where the trip member is placed ahead of the trap platform. In the latter case a rat or other of the cautious type of rodents will become suspicious when it sees light passing upwardly between the two members.

A very important advantage of my trap is the high sensitivity incorporated in the trip element due to the lever action provided by its manner of mounting. Although this trip element is extremely sensitive, the latch mechanism for maintaining the platform in closed position is more than adequate to support the weight of one or more rats prior to the release of the latch.

Another important feature of my trap is the fact that it automatically re-sets itself whereby it becomes possible to catch any number of rats, limited only by the size of the retaining chamber 5, without paying any further attention to the trap. Also my trap can not be sprung without the entire body of the rat being within the lane structure shown. The platform 16 provides a misleading sense of security to the rat while in the lane structure until the animal trips the trip element 22. Thereafter it is too late for the rat to re-consider its actions for it is quickly and surely dumped into the retaining chamber 5 below.

It will, of course, be understood that various changes may be made in the form, details, arrangement and proportions of the parts without departing from the scope of my invention.

What I claim is:

A rodent trap comprising structure defining a lane, a trap platform extending longitudinally at the bottom of said lane, means for hinging said trap platform on an axis extending longitudinally of said lane, means for urging said trap platform to closed, substantially horizontal position, a depending latch element pivotally secured adjacent its upper end to said lane structure and urged into latching position solely by gravity, and a shiftable trip member disposed in said lane and comprising an angularly bent plate having a substantially horizontal pressure-receiving portion adjacent the forward portion of said platform and a downwardly extending portion shiftably anchored to said trap platform at its lower end, said downwardly extending portion being bent acutely with respect to said horizontal portion to provide maximum lateral movement thereof when said horizontal portion is moved vertically, said trip member having a cooperating latch element formed in said acutely bent portion and disposed opposite said first mentioned latch element when said platform is returning to closed position and adapted to engage said first mentioned latch element to co-operatively hold said platform in closed position despite the weight of a rodent supported thereon, said trip member being adapted to cause as a result of said lever action said second mentioned latch element to disengage from said first mentioned latch element when a very light pressure is applied against said pressure-receiving portion.

GUST LUNDQUIST.

References Cited in the file of this patent
UNITED STATES PATENTS

| Number | Name | Date |
| --- | --- | --- |
| 189,346 | Early | Apr. 10, 1877 |
| 379,713 | Moxley | Mar. 20, 1888 |
| 884,453 | Arnesen | Apr. 14, 1908 |
| 947,250 | Marchand | Jan. 25, 1910 |
| 1,182,277 | Jones | May 9, 1916 |
| 1,320,841 | Carlson et al. | Nov. 4, 1919 |
| 1,653,411 | Poe | Dec. 20, 1927 |